United States Patent
Chatry

(10) Patent No.: US 9,779,543 B2
(45) Date of Patent: Oct. 3, 2017

(54) METHOD FOR PROVIDING AND RECEIVING INFORMATION REPRESENTING PHYSICAL FEATURES OF A PORTION OF A THREE DIMENSIONAL SURFACE

(71) Applicant: my Virtual Reality Software AS, Oslo (NO)

(72) Inventor: Olivier Chatry, Oslo (NO)

(73) Assignee: MY VIRTUAL REALITY SOFTWARE AS, Oslo (NO)

(*) Notice: Subject to any disclaimer, the term of this patent is extended or adjusted under 35 U.S.C. 154(b) by 197 days.

(21) Appl. No.: 14/195,723

(22) Filed: Mar. 3, 2014

(65) Prior Publication Data
US 2014/0250156 A1    Sep. 4, 2014

(30) Foreign Application Priority Data
Mar. 4, 2013    (EP) .................................... 13157545

(51) Int. Cl.
*G06T 17/00*    (2006.01)
*G06F 17/30*    (2006.01)

(52) U.S. Cl.
CPC ........ G06T 17/005 (2013.01); G06F 17/3033 (2013.01); G06F 17/30097 (2013.01); G06F 17/30327 (2013.01)

(58) Field of Classification Search
CPC .......... G06F 17/3033; G06F 17/30961; G06F 17/30327; G06F 17/30221; G06F 17/30097; G06F 17/30
See application file for complete search history.

(56) References Cited

U.S. PATENT DOCUMENTS

| 5,742,807 | A | 4/1998 | Masinter |
| 6,496,189 | B1 | 12/2002 | Yaron et al. |
| 7,551,172 | B2 | 6/2009 | Yaron et al. |
| 2004/0236761 | A1 | 11/2004 | Both |

(Continued)

FOREIGN PATENT DOCUMENTS

CN    1892650 A    1/2007

OTHER PUBLICATIONS

European Search Report dated Jul. 11, 2013 as received in Application No. EP 13 15 7545.

*Primary Examiner* — Bruce Moser
(74) *Attorney, Agent, or Firm* — Maschoff Brennan

(57) ABSTRACT

A method for providing information representing physical features of a portion of a three-dimensional surface, the information including data files at different resolution levels. The data files are stored in a hierarchical file system. A hash value is computed from a file designator of a data file and is assigned to the data file. The data file is stored according to the assigned hash value in the file system. A request hash value is received from the external device, and a data file that has an assigned value corresponding to the request hash value is provided to the external device. A method for receiving such information is also provided, in which information including an information designator is requested. A request hash value is computed from the information designator and transmitted to the server. A data file that includes the requested information is received from the remote server.

21 Claims, 9 Drawing Sheets

(56) References Cited

U.S. PATENT DOCUMENTS

| | | | |
|---|---|---|---|
| 2006/0294152 A1 | 12/2006 | Kawabe et al. | |
| 2007/0242077 A1* | 10/2007 | Danan | G06T 1/60 345/536 |
| 2010/0268692 A1* | 10/2010 | Resch | G06F 11/1044 707/687 |
| 2012/0173606 A1* | 7/2012 | Becker | G01C 21/32 709/203 |
| 2012/0304087 A1* | 11/2012 | Walkin | G06F 17/30241 715/764 |
| 2014/0089273 A1* | 3/2014 | Borshack | G06F 17/30097 707/692 |

* cited by examiner

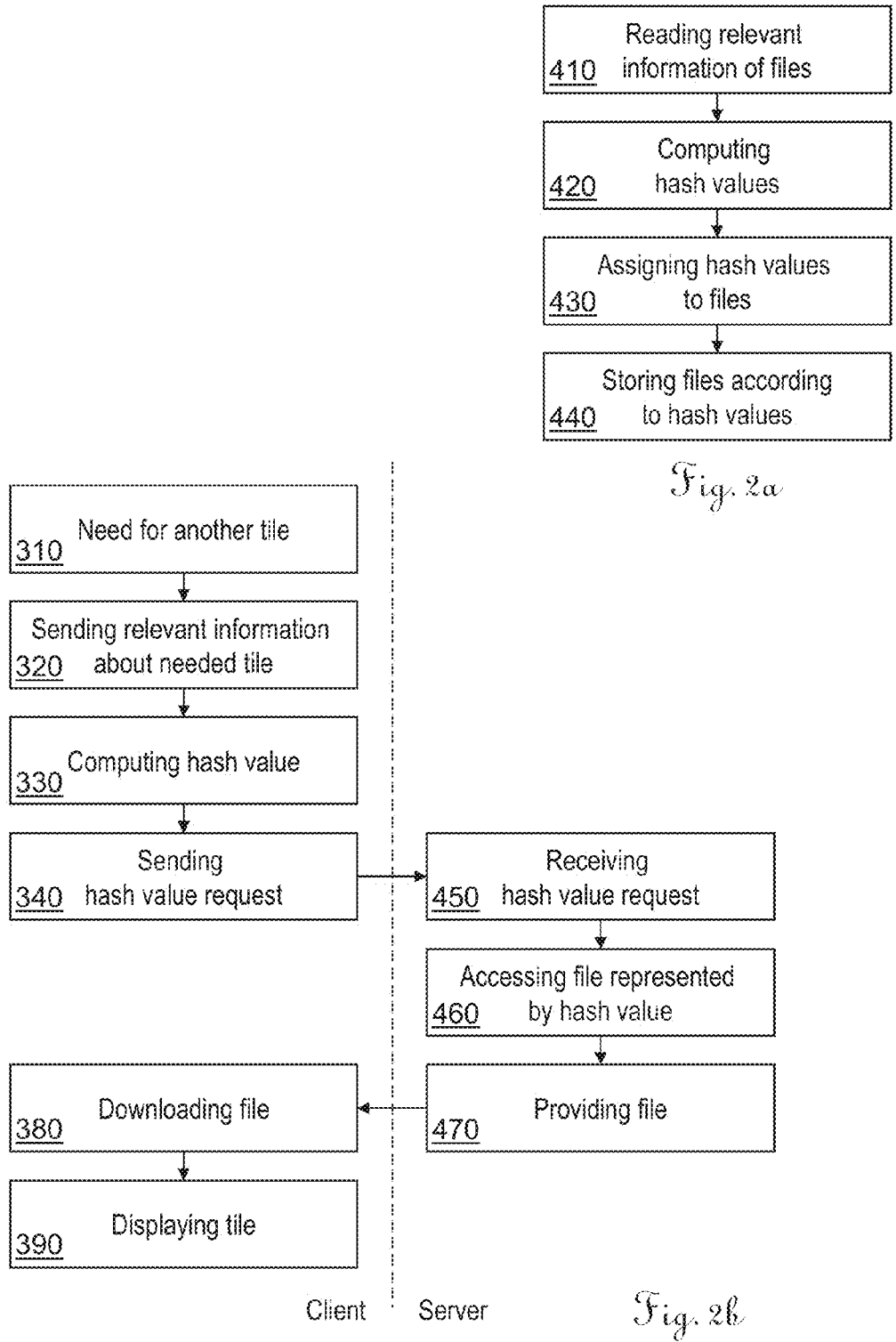

METHOD FOR PROVIDING AND RECEIVING INFORMATION REPRESENTING PHYSICAL FEATURES OF A PORTION OF A THREE DIMENSIONAL SURFACE

FIELD OF THE INVENTION

The present invention pertains to a method for providing information representing physical features of a portion of a three-dimensional surface to a client, particularly a mobile device, to a method for receiving such information from a server, and to a server-client-system.

BACKGROUND

When storing data files in folders of a tree structure of a file system, an important issue is to store these files in such a way that they can be accessed without delay, i.e. as quickly as possible. This issue in particular pertains to the provision of data files representing a three-dimensional surface, e.g. a map or images of a terrain, to mobile devices by a remote server.

Computer rendering of three-dimensional terrain images is known from prior art: U.S. Pat. No. 7,551,172 B2 discloses a method for sending information representing three-dimensional images over a network, and U.S. Pat. No. 6,496,189 B1 discloses a method and apparatus for displaying images of an area as seen from an interactively chosen viewpoint on a remote device.

With the methods described in these prior art documents, however, due to inherent limitation on the implementation of the file system, problems can occur that delay the provision of data. In particular, the file system can become unbalanced, i.e. the amount of files per folder can vary considerably, resulting in delayed access times depending on the number of files per folder and the amount of subordinate folders per folder. If a folder contains too many individual files and/or folders, this generally results in slower access and listing times. A well balanced file structure is always faster to access.

SUMMARY

It is therefore an object of the present invention to provide an enhanced method for the provision of three-dimensional terrain information.

It is a particular object of the invention to provide the information faster than with conventional methods.

It is another object of the invention to provide an enhanced method for receiving three-dimensional terrain information from a remote server.

It is a particular object of the invention to receive the information faster than with conventional methods.

It is another object of the invention to provide a mobile device and a server for execution of said methods.

It is a particular object to provide a server-client-system for execution of said methods.

A further object of the invention is the provision of computer programme products for execution of said methods.

Data belonging to a hierarchical structure is provided in a multitude of data files. According to the present invention, an individual, unambiguous value is assigned to each of these files. This value is a hash value that is computed by means of a hash algorithm using a file designator, i.e. the file name or any other relevant information from the file that allows unambiguous identification of the file. The files are then stored in a hierarchical file system according to their respective hash value, thus resulting in a balanced tree structure of the file system.

The data is displayable on a remote device, particularly a mobile device. If there is a demand for displaying certain data, a request hash value is computed from an information designator, the information designator for instance comprising X- and Y-coordinates and a resolution level. A request for downloading the required data from the file system is then transmitted comprising this request hash value. In particular, only the request hash value is transmitted as a request. With this request hash value the file having a corresponding assigned hash value is identified and provided to the remote device. As the tree structure of the file system is balanced, the average access time for files is effectively reduced.

Both devices—the providing device as well as the requesting device—must obviously use the same hash algorithm and the same or equivalent designators for computing the hash value. The hash value can be computed by means of basically all known hash algorithms, thus allowing an operator to select the best one that fits the purpose of balancing the respective file system.

A method for providing information representing physical features of a portion of a three-dimensional surface, the information being comprised by data files at a plurality of different resolution levels, wherein the data files are stored in a hierarchical file system, according to the invention comprises the following steps:

assigning a hash value to a data file, wherein the assigned hash value is computed from a file designator of the data file, storing the data file according to the assigned hash value in the file system, receiving a request hash value from a requesting device, and providing a data file to the requesting device, the assigned hash value of the data file corresponding to the request hash value.

In one embodiment the data files describe a terrain, and the file designator comprises at least a position information, particularly at least one coordinate of a point on the surface or a position indicator of a tile, and a resolution level information.

In one embodiment the file designator comprises an original file name of the data file. In another embodiment the file designator comprises data from the header of the file.

In one embodiment assigning the hash value to a data file comprises assigning a file name to the respective data file, in particular assigning the hash value as a file name or as a part of a file name.

In a preferred embodiment the data files are distributed evenly or basically evenly in the file system.

In one embodiment the file system comprises a plurality of folder levels including a lowest folder level, each folder level comprising a multitude of folders, the data files being distributed basically evenly in the folders of the lowest folder level. In particular, the folders of the lowest folder level comprise at least one data file, in particular exactly one data file, and the folders of all other folder levels comprise at least one subordinate folder each, in particular a multitude of subordinate folders.

The hash value also allows reducing the number of files per folder by splitting the hash value into sections and creating a folder for each of these sections. The sections particularly comprise one character (e.g. a numeral or alphabetic character) of the hash code each. A main folder then, for instance, contains subordinate folders named "A" to "Z", folder "B" comprising the subordinate folders "BA" to "BZ", folder "BG" comprising the subordinate folders "BGA" to "BGZ" and so on. In the lowest folder level, for instance, a folder "BGJEDST" then might comprise all data files having a hash value from "BGJEDSTA" to "BGJEDSTZ". Alternatively, each folder of the lowest level comprises only one data file having the hash value corresponding to the name of the respective folder. In one embodiment the assigned hash value therefore comprises a multitude of characters, and the method further comprises assigning to a multitude of folders one or more characters of the hash value, in particular as a folder name, or defining a multitude of sections of the hash value, each section comprising one or more characters of the hash value, and assigning a multitude of folders one or more sections of the hash value, in particular as a folder name.

Every folder is then assigned different characters or sections, respectively.

In one embodiment the requesting device is a mobile device designed for displaying the information on a display, the mobile device in particular being a navigation device, a mobile phone, e.g. a Smartphone, or a tablet computer.

In one embodiment for avoiding collisions, computing the assigned hash value comprises using two different hash algorithms, particularly CRC32 and SHA1 hash algorithms. In case a hash value would be assigned twice, i.e. to more than one data file, a second hash algorithm can then be used to calculate another, individual hash value for one of the two data files. For example, the CRC32 algorithm is used for calculating the hash value normally. If the hash value already exists, another hash value is then calculated, e.g. using the SHA1 algorithm. Especially if the number of data files is very large, even the use of three or more different hash algorithms can become necessary.

The present invention also pertains to a method for receiving information from a server.

A representation of a three-dimensional terrain comprises a multitude of portions, for instance bitmap tiles. Each portion is identifiable by an information designator—e.g. comprising information about its position, i.e. XY-value, and its resolution level, and optionally other relevant information, for instance the version. Using the information designator of a portion, according to the invention a request hash value is computed by means of a hash algorithm. This hash value is used for a request to download the information of the portion from a server. The request can be performed by a downloading unit or directly by the requesting unit over the network. Any network protocol that allows downloading a file can be used for the request, for instance Hypertext Transfer Protocol (HTTP). In case of HTTP, the URL comprises a base server address and the hash value. Depending on the used network protocol other constructions can be utilizable, e.g. packet forging.

The downloading unit of the device then receives the data and forwards it to the requesting unit and, optionally, also to a cache unit—either directly to the file system or to a database.

If the file is already on a cache of the mobile device, no network access will occur. Instead, using the hash value the data can be loaded directly from the cache system. Depending on the kind of cache system, for instance a database or a file system, the index key can be the hash value or a combination of folder name and file name.

Preferably, the processor connects to the server via a communication link, preferably a public network, such as the Internet. Preferably, the data is conveyed by a standard modem at sufficient speed for relatively smooth display of the terrain tiles.

A method for receiving information representing physical features of a portion of a three-dimensional surface from a remote server, the information being comprised by data files at a plurality of different resolution levels, according to the invention comprises the following steps:

requesting information comprising an information designator, computing a request hash value from the information designator, transmitting the request hash value to the server, and receiving a data file from the remote server, wherein the data file comprises the requested information.

In one embodiment the method is executed on a mobile device comprising a display for displaying the information, the mobile device particularly being a navigation device, a mobile phone, e.g. a Smartphone, or a tablet computer.

In one embodiment the information designator comprises at least a position information, particularly at least one coordinate of a point on the surface, and a resolution level information.

In one embodiment for avoiding collisions, computing the request hash value comprises using two different hash algorithms, particularly CRC32 and SHA1 hash algorithms. Preferably, in order to always provide the correct data file, in the request for a file both hash values are sent. Alternatively, only the first hash value is sent at first, and an ambiguous hash value is detectable at the server, so that if the hash value is ambiguous, the server may request to calculate the second hash value and to send it as a request hash value.

The present invention also pertains to a mobile device, a server and a server-client-system.

A mobile device adapted for receiving information representing physical features of a portion of a three-dimensional surface from a server, the information being comprised by data files at a plurality of different resolution levels, the mobile device comprising a display for displaying the information, according to the invention comprises the following:

calculation means having a hash algorithm, adapted for calculating a request hash value from an information designator, the information designator being derived from required additional information that is to be displayed on the display, transmission means adapted to transmit the request hash value to the server, and reception means adapted to receive from the server a data file which comprises the required additional information.

A server adapted for providing information representing physical features of a portion of a three-dimensional surface to a client, particularly a mobile device, the information being comprised by data files at a plurality of different resolution levels, the server comprising storing means for storing a hierarchical file system comprising a multitude of data files, according to the invention comprises the following:

reception means adapted to receive a request hash value from the client, and provision means adapted to provide a data file to the client, an assigned hash value of the data file corresponding to the request hash value.

In particular, the server also comprises calculation means having a hash algorithm, adapted for calculating a hash value from a file designator of a data file.

The present invention also pertains to a server-client-system. A server-client-system for performing the methods described above according to the invention comprises a mobile device and a server as described above, both being adapted for establishing a connection for exchanging data via a private or public network.

In particular, a server-client-system according to the invention comprises a mobile device and a server that are adapted for establishing a connection for exchanging data via a private or public network. The server comprises storing means for storing a file system comprising a multitude of data files, and the mobile device comprises a display for displaying data comprised by the data files. The mobile device and the server, both, comprise calculation means having a hash algorithm. The hash algorithm of the calculation means of the server is adapted for calculating an assigned hash value from a file designator of a data file, the data file comprising data that is displayable by the mobile device, and the hash algorithm of the calculation means of the mobile device is adapted for calculating a request hash value from an information designator of data that is to be displayed by the mobile device. The mobile device is adapted to transmit the request hash value to the server, and the server is adapted to provide to the mobile device a data file which comprises the data that is to be displayed by the mobile device, in particular wherein an assigned hash value of the provided data file corresponds to the request hash value.

The invention also pertains to computer programme products for performing the methods as described above, in particular when run on calculation means of a mobile device or a server, respectively, as described above.

BRIEF DESCRIPTION OF THE DRAWINGS

The invention in the following will be described in detail by referring to exemplary embodiments that are accompanied by figures, in which:

FIG. 2a is a flow chart illustrating a method according to the present invention for storing data files in a tree structure;

FIG. 2b is a flow chart illustrating a method according to the present invention for providing data files from a server to a client;

DETAILED DESCRIPTION

Figure 1A:
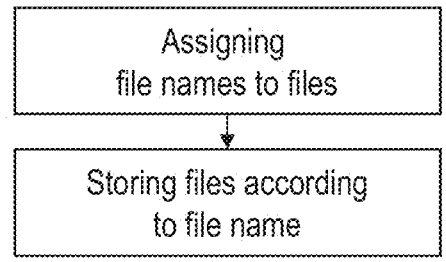
FIG. 1a is a flow chart illustrating a method according to the prior art for storing data files in a tree structure.
Figure 1B:
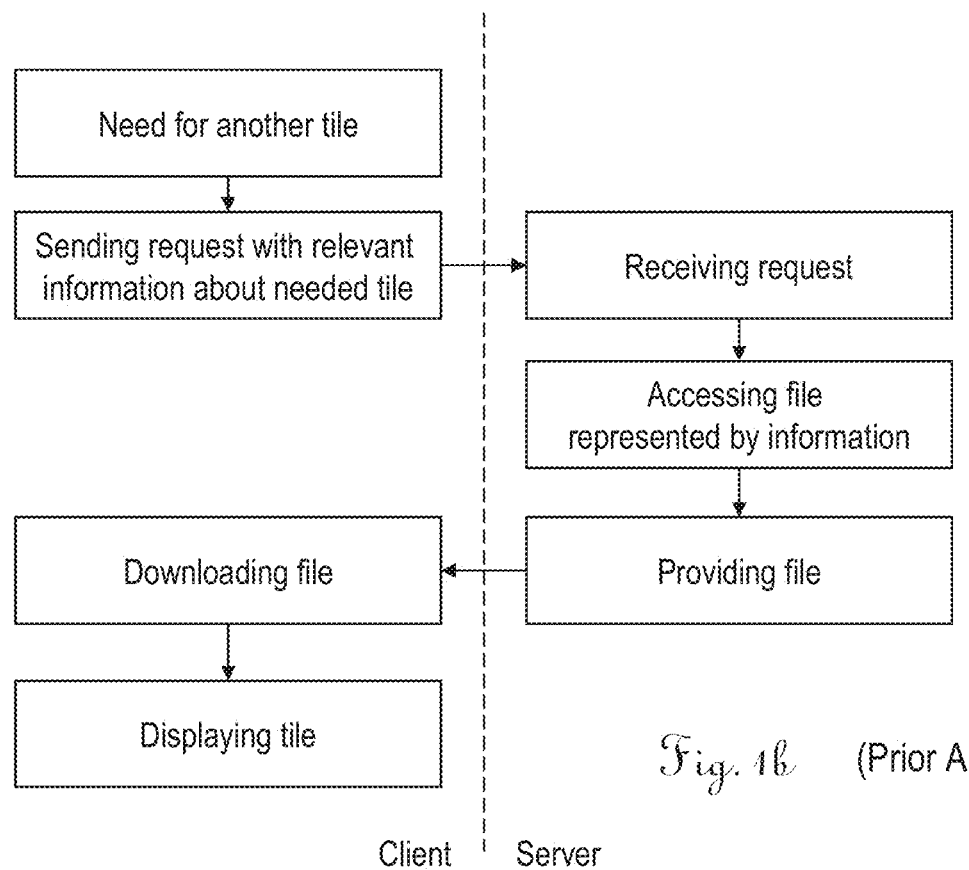
FIG. 1b is a flow chart illustrating a method according to the prior art for providing data files from a server to a client.

In FIGS. 1a and 1b two exemplary methods known from prior art are illustrated by means of flow charts.

FIG. 1a is a flow chart illustrating a conventional method for storing data files in a file system. The data file is assigned a "logical" file name according to file information of the data file and then stored in the file system according to the assigned name.

For instance, if the data files describe a three-dimensional terrain, a "logical" file name might comprise X- and Y-coordinates and a resolution level. Normally, for some parts of the terrain more resolution levels are available than for other parts of the terrain: For instance, for cities normally higher resolutions (and thus more resolution levels) are available than for oceans or deserts. Thus, the available data is not distributed evenly among the terrain. If the data is not distributed evenly, though, the data files having a "logical" file name are neither. This, disadvantageously, leads to an unbalanced file system and to a slower average accessibility of the data files.

FIG. 1b is a flow chart illustrating a conventional method for providing the stored data files from a server to a client. The data files describe a two- or three-dimensional terrain and belong to a hierarchical structure which includes data files at a plurality of different resolution levels. On the left side those steps that are performed by a mobile device (client) for displaying the terrain are shown, on the right side those steps that are performed by a remote server are shown.

If the mobile device needs to display a new tile of the terrain, for instance because of a user input, the device sends a request for this tile to the server. The request comprises relevant information in order to identify the correct data file. The information may comprise coordinates and resolution level or a "logical" file name based on this information. The request is received by the remote server, and, the data file corresponding to the transmitted information is accessed in a file system of the server. As described in FIG. 1a, the file system is unbalanced, though. This means that accessing times, disadvantageously, may vary severely and in average are slower than necessary. The accessed file is then provided to and downloaded by the mobile device. Finally, the terrain tile is displayed to the user.

In FIGS. 2a and 2b by means of flow charts two methods according to the invention are illustrated, the methods corresponding to those illustrated in FIGS. 1a and 1b.

FIG. 2a shows a flow chart illustrating an example of a method for providing data files in a balanced file system according to the invention. In a first step 410, relevant information from the file is read. In contrast to FIG. 1a, this information is not assigned as a "logical" file name. Instead, the information is used for computing a hash value (step 420). The hash value is then assigned to the file (step 430), particularly as a new file name. The file in a last step 440 is then stored in a file system according to its hash value.

For instance, all files have a hashed file name consisting of n characters. All files having the first n−1 characters in common are stored in the same folder with the folder name being the first n−1 characters, this folder being stored in another folder with the folder name being the first n−2 characters, and so on. As the hash value is a quasi-random value, the files are distributed basically evenly in the file system.

FIG. 2b shows a flow chart illustrating an example of a method according to the invention for providing data files from a server to a client. Analogous to FIG. 1b, on the left side those steps that are performed by a mobile device (client) for displaying the terrain are shown, on the right side those steps that are performed by a remote server are shown. The mobile device for example can be a navigation device, a Smartphone, a tablet computer or any other hand held device having a display and means for establishing a connection to a remote server via a public network such as the internet. If the mobile device needs to display a new tile of the terrain (step 310), for instance because of a user input, relevant information about the needed tile is send to a computing unit (step 320). The information may comprise coordinates and resolution level of a certain point in the terrain or a "logical" file name based on this information. Based on the information, a hash value is calculated (step 330) in the same way as it has been done in the server for storing the files (as described in FIG. 2a). The hash value is then sent as a request to the remote server (step 340). The request is received by the remote server (step 450), and, the data file having assigned a hash value matching the transmitted hash value is accessed in a file system of the server (step 460). As the file system is balanced, accessing times, advantageously, basically do not differ. The accessed file is then provided to (step 470) and downloaded by (step 380) the mobile device. Finally, the terrain tile can be displayed to the user (step 390).

Figure 3A:
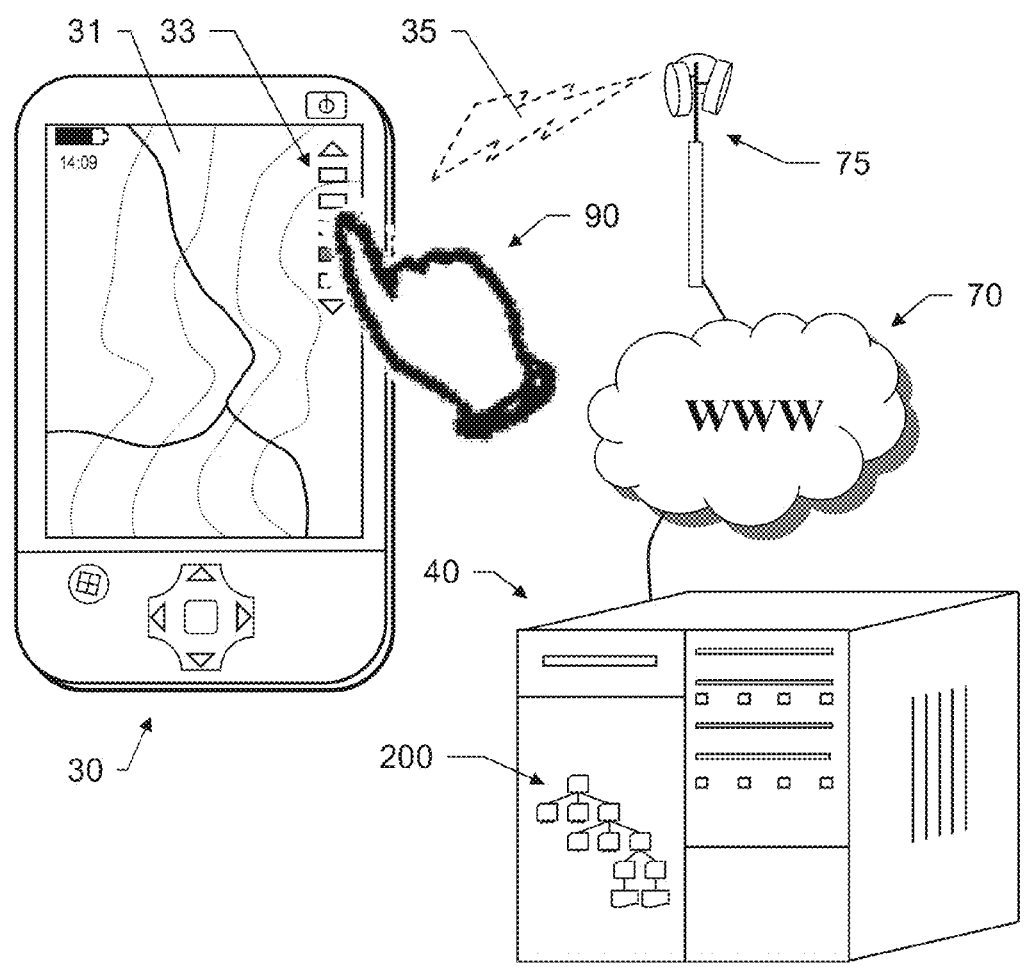
FIG. 3a shows a first embodiment of the provision of data from a remote server to a mobile device.
Figure 3B:
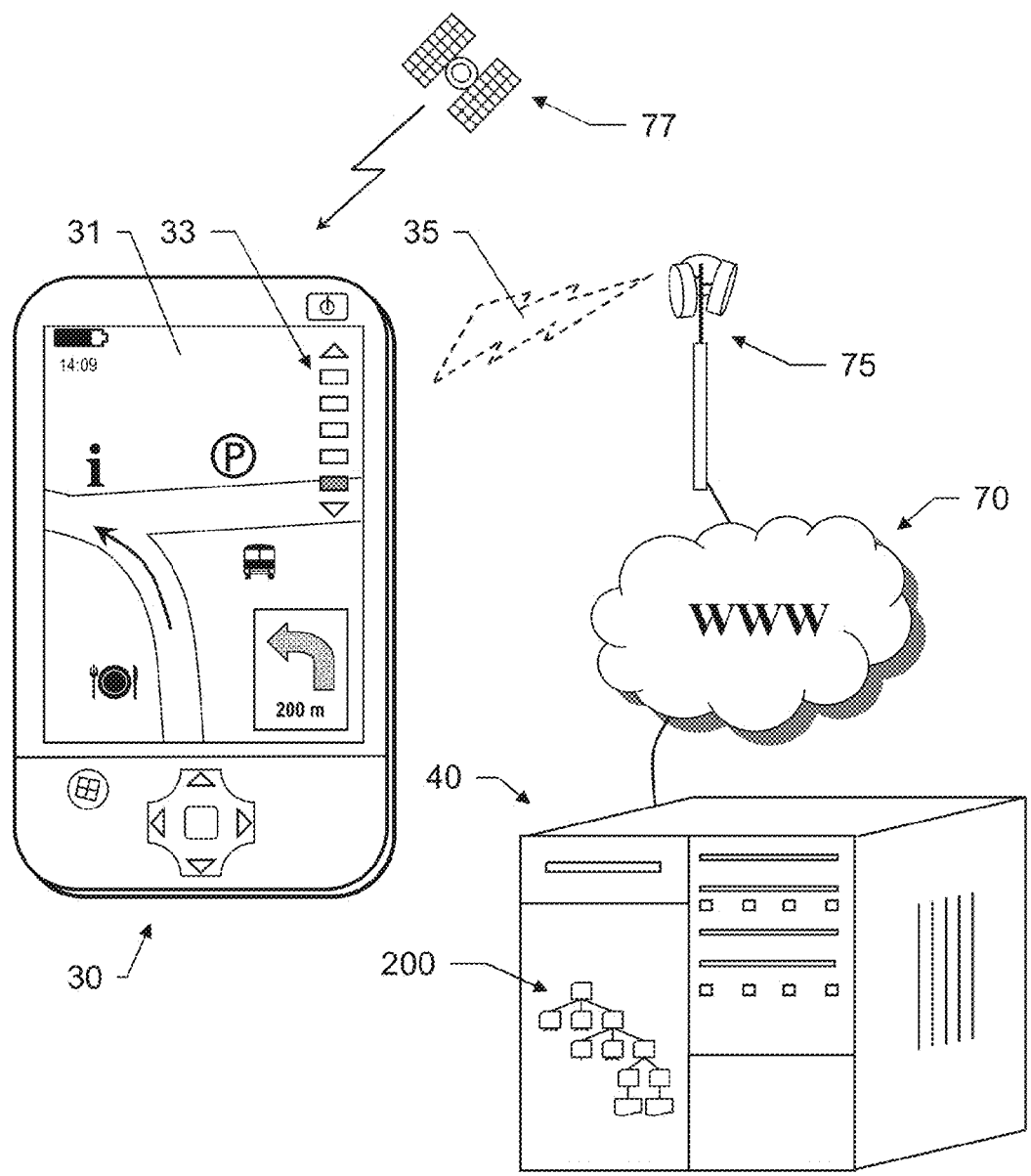
FIG. 3b shows a second embodiment of the provision of data from a remote server to a mobile device.

In FIGS. 3a-b two exemplary embodiments of a server-client-system according to the invention are depicted. Both Figures show a mobile device 30 as a client, having a display 31 for displaying a representation of a three-dimensional terrain. The mobile device 30 has communication means for establishing a connection with a remote server 40 via the internet 70, in particular by means of a wireless connection 35 to a cell phone tower 75. On the remote server 40 data files are stored in a file system 200, the data files comprising information about the three-dimensional terrain.

In FIG. 3a a programme for displaying a terrain on the display 31 is executed on the mobile device 30. A user interaction 90 on a zoom bar 33 changes a desired resolution level of the currently displayed part of the terrain. In FIG. 3b a navigation programme, displaying on the display 31 a surrounding terrain of the present location, is executed on the mobile device 30. The mobile device receives data about its current position from a Global Navigation Satellite System (GNSS)—here represented by a single satellite 77—such as the NAVSTAR Global Positioning System (GPS). As the mobile device 30 changes its position—for instance as a part of a vehicle—a different part of the terrain needs to be displayed on the display 31.

In both cases depicted in FIGS. 3a and 3b, a request unit of the mobile device 30 sends a request to the remote server 40 to provide a certain data file for downloading, the data file comprising the needed information about the terrain, e.g. a certain tile of the terrain in the correct resolution level. Particularly, the data file comprises a bitmap of the needed part of the terrain in the needed resolution level. The remote server 40 then sends the requested file to the mobile device 30, so that the information is displayable on the display 31.

According to the present invention, the data is stored in the file system 200 according to a hash value, which has been computed by a hashing algorithm from relevant information, e.g. X- and Y-position of the tile and its resolution level. Thus, the data is essentially distributed evenly in the file system 200. In one embodiment, also the request is sent in form of a hash value, the same hashing algorithm—being implemented in a computing unit of the mobile device 30—computing the hash value for the requested tile. No other information than the hash value needs to be transmitted in the request. In another embodiment, an information designator of a needed tile is transmitted to the server 40 as a request and the hash algorithm of the server 40 calculates the request hash value.

Figure 4:
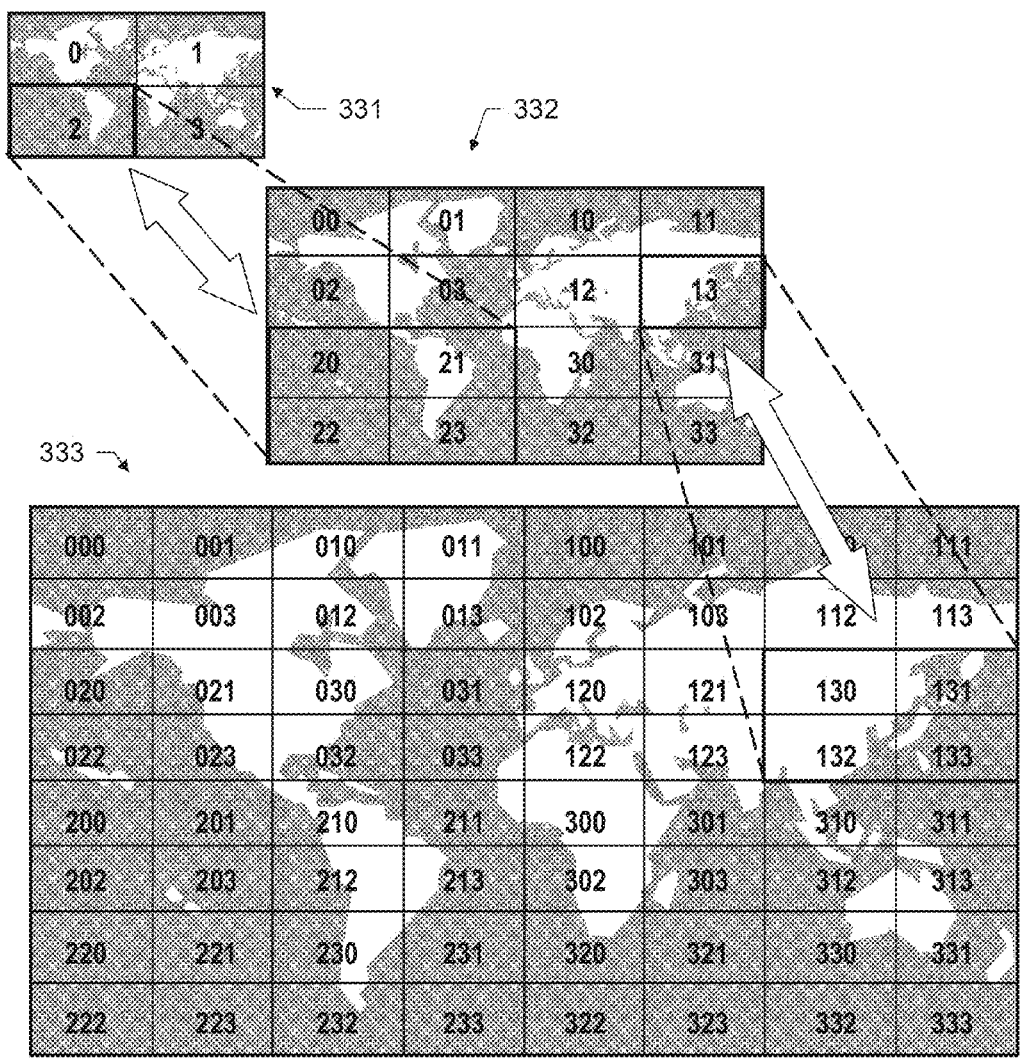
FIG. 4 shows the distribution of tiles in different resolution levels of a representation of a terrain.

FIG. 4 shows an example for a representation of a terrain in three different resolution levels 331-333. The representation is subdivided into a multitude of tiles, each of which particularly comprising a bitmap of a part of the representation. Each tile is assigned a number from which its position and resolution level can be derived. In particular, each tile is comprised by a certain data file.

In this example, in the first resolution level 331 the terrain is subdivided into the four rectangular tiles with the numbers "0", "1", "2" and "3", each corresponding to four tiles of the second resolution level 332 which is, thus, subdivided into sixteen tiles. Tile "2" of the first resolution level e.g. corresponds to tiles "20", "21", "22" and "23" of the second resolution level. Each of the second resolution level tiles corresponds to four tiles of the next higher level, the third resolution level 333, so that this level is subdivided into sixty-four tiles. Tile "13" of the second resolution level e.g. corresponds to tiles "130", "131", "132" and "133" of the second resolution level.

With n resolution levels, in this example the highest resolution level could comprise up to $4^n$ tiles—provided that for the whole terrain a bitmap is available in the respective resolution. A $10^{th}$ resolution level thus could comprise more than a million tiles, a $20^{th}$ resolution level more than a trillion. Normally though, only a part of a terrain is available at higher resolution levels, as for most applications there is no real need for high resolution bitmap tiles of ocean or desert parts of the terrain. Additionally, for certain facilities, such as military bases, high resolution pictures might not be allowed in some countries.

Traditionally, this irregular distribution of tiles of the map would lead to an uneven distribution of files in a file system.

Figure 5A:
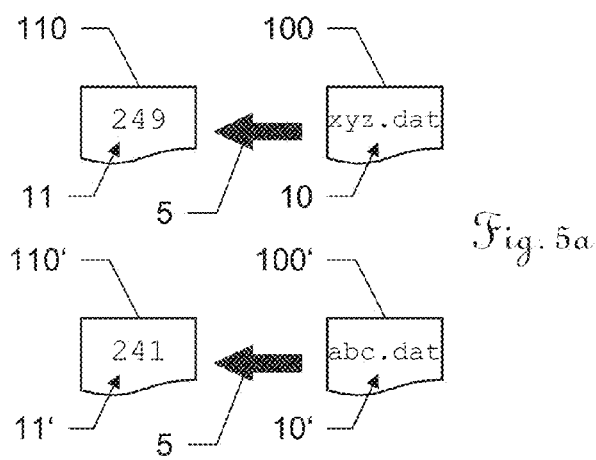
FIG. 5a illustrates the calculation of a hash value for a data file from coordinates and a resolution level.

FIG. 5a illustrates a first example for the calculation of a hash value for a data file. A first original data file 100 has an original ("logical") file name comprising a file designator 10, for instance a tile number of a certain resolution level (see FIG. 4) or a certain coordinate. In this simplified example the name of the first data file 100 is "xyz.dat". From this file name a hash algorithm 5 calculates a first hash value 11—in this simplified example comprising the three characters "249"—which is assigned as a new file name to the first hashed data file 110. A second original data file 100' has an original "logical" file name comprising a file designator 10'. In this simplified example the name is "abc.dat". From this file name the same hash algorithm 5 calculates a second hash value 11' (in this simplified example "241"), which is assigned as a new file name to the second hashed data file 110'.

Figure 5B:
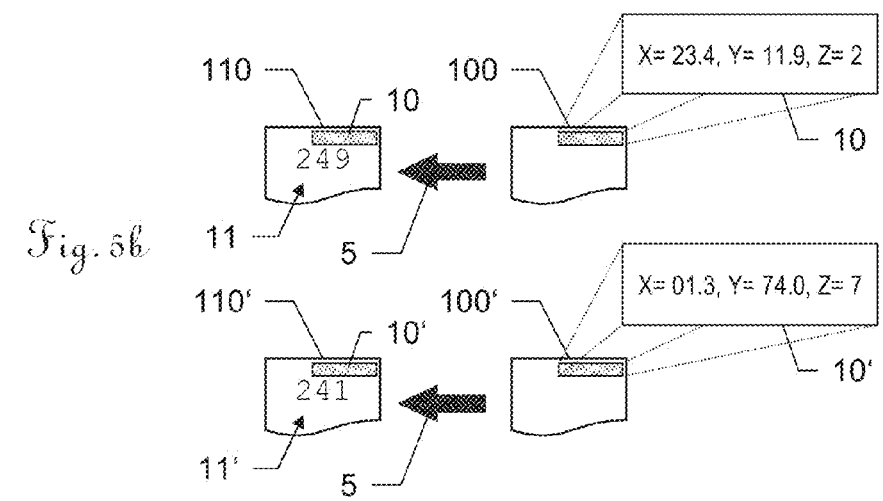
FIG. 5b illustrates the calculation of a hash value for a data file from the file name.

Obviously, also other file designators 10 than the original file name can be used for the calculation of a hash value. The file designator 10 can for example be comprised by a file header of the file. In case of a three-dimensional terrain that is described by the data files, the file designator 10 and/or file name can comprise coordinates and a resolution level or a number of a tile. FIG. 5b illustrates a second example for the calculation of a hash value for a data file. The original data files 100,100' each comprise a file designator 10,10' for identifying the data files 100,100'. In this example, the file designator are X- and Y-coordinates and a resolution level. These are used by the hash algorithm 5 for calculating the hash values 11,11'.

Figure 5C:
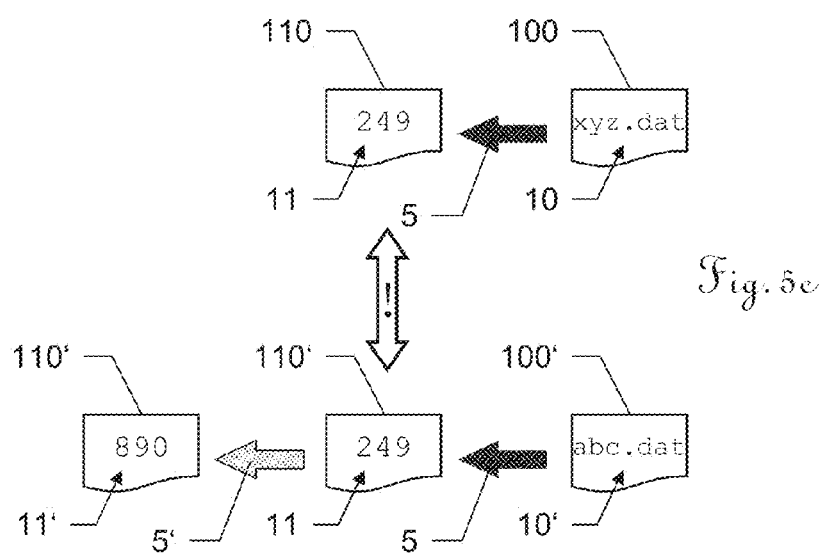
FIG. 5c illustrates the calculation of a hash value for a data file using two different hash algorithms.

In one embodiment, as shown in FIG. 5c, two different hash algorithms 5,5' are used. This means that if a hash value 11 would be assigned twice, i.e. to more than one data file 110, a second hash algorithm 5' can be used to calculate another, individual hash value 11'. For example, the "CRC32" algorithm 5 is used for calculating the hash values 11,11' for the data files 100,100', normally. If a calculated hash value 11 is assigned already to another data file 110, another hash value 11' is calculated by a second algorithm 5', e.g. the "SHA1" algorithm. Especially if the number of data files 110 is very large, even the use of three or more different hash algorithms 5,5' can become necessary.

Preferably, with respect to this embodiment and FIGS. 3a and 3b, in order to always provide the correct data file 110, in the request for a file both hash values 11,11' are sent. Alternatively, only the first hash value 11 is sent at first, and an ambiguous hash value is detectable, so that if the hash value 11 is ambiguous the server may request to calculate and send the second hash value 11'.

Figure 6:
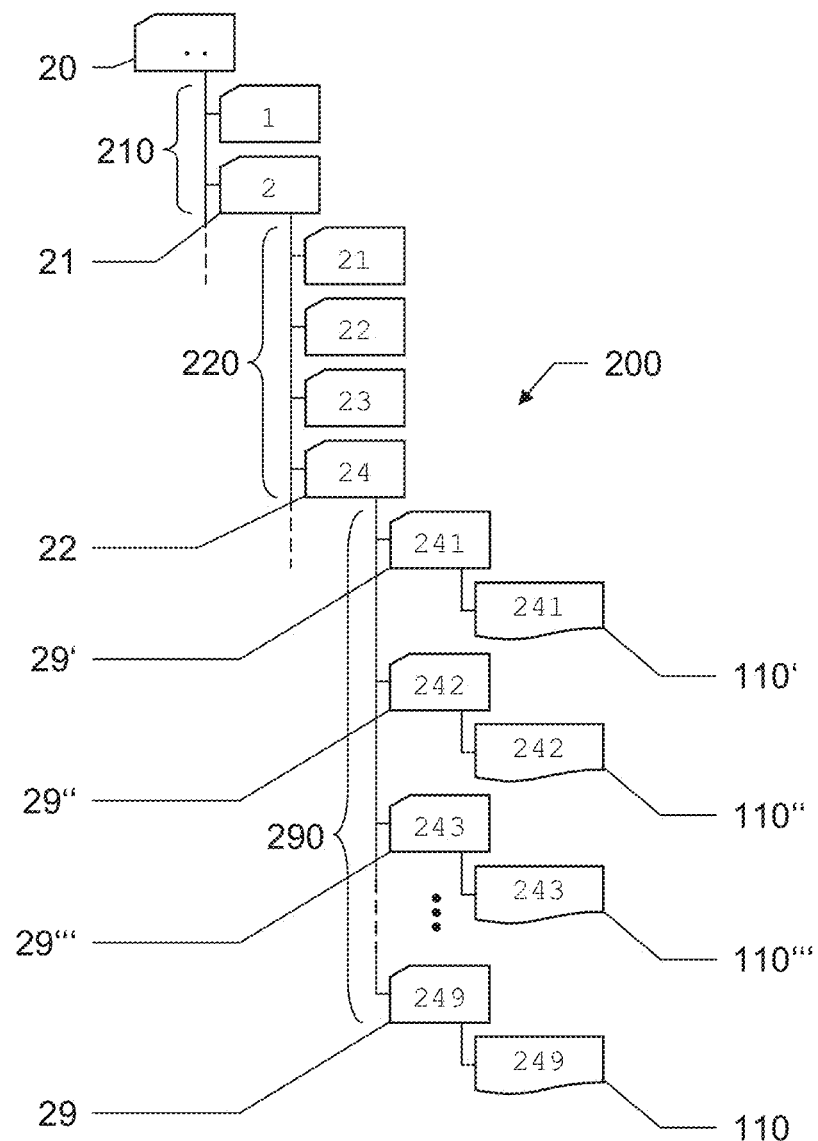
FIG. 6 shows a first exemplary data tree structure according to the invention.

FIG. 6 shows a file system 200 with a first exemplary data tree structure according to the invention. This simplified file system comprises a main folder 20 with a multitude of subordinate folders of a first folder level 210, each of the folders having at least one subordinate folder, in particular a multitude of subordinate folders, of a second folder level 220. This is shown for clarity reasons for one folder 21 only. As well, each of the folders of the second folder level 220 has at least one subordinate folder, in particular a multitude of subordinate folders. For the second folder level 220 this is shown only for one folder 22 again. In the lowest folder level 290 each folder 29-29''' comprises one data file 110-110'''.

The hash value also allows reducing the number of files per folder by splitting the hash value into sub-parts and creating a folder for each of these sub-parts. The sub-parts particularly comprise one character of the hash code each, but can also comprise two or more characters.

In the first folder level 210 the folders have folder names with only one character; in the second folder level 210 the folder names have two characters, and so on. In this simplified example, the hash value comprises three characters, so that in total there are only three folder levels 210,220,290. In the lowest folder level 290 the folders have the same amount of characters as the hash values of the data files 110-110'''.

Figure 7:
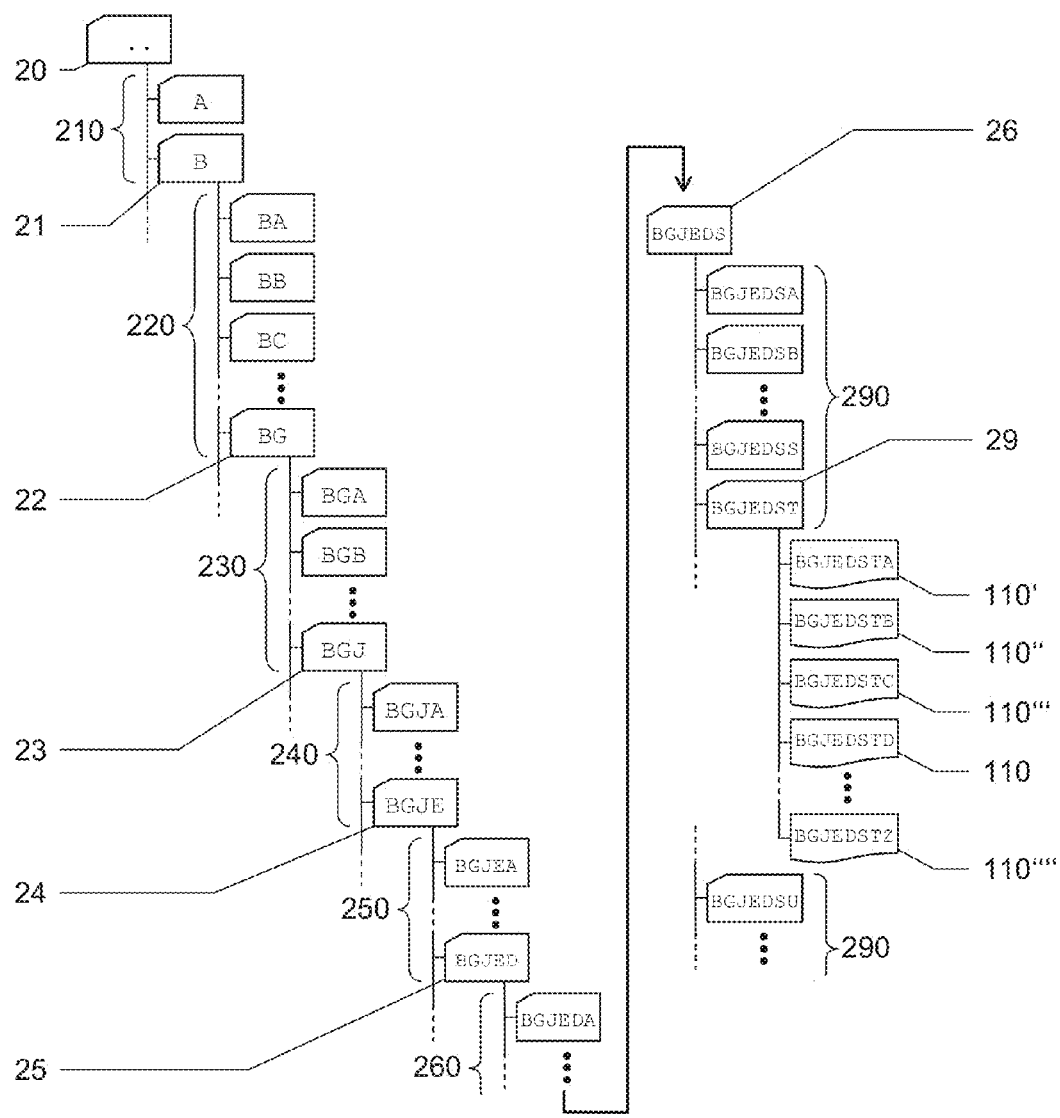
FIG. 7 shows a second exemplary data tree structure according to the invention.

FIG. 7 shows a file system 200 with a second exemplary data tree structure according to the invention. The file system 200 comprises a main folder 20 with a multitude of subordinate folders of a first folder level 210, each of the folders having at least one subordinate folder, in particular a multitude of subordinate folders, of a second folder level 220. This is shown for clarity reasons for one folder 21 only. As well, each of the folders of the second folder level 220 has at least one subordinate folder, in particular a multitude of subordinate folders. This is the same for all folders of all folder levels 230,240,250,260 but the lowest folder level 290. For the second to fifth folder level 220,230,240,250, 260 this is shown only for one folder 22-26 each. In the lowest folder level 290 each folder comprises at least one data file 110-110'''', in particular a multitude of data files 110-110''''. This is shown for clarity reasons for one folder 29 only.

The main folder 20 in this example comprises sub-folders named "A" to "Z", folder 21 "B" comprising sub-folders from "BA" to "BZ", folder 22 "BG" comprising sub-folders from "BGA" to "BGZ" and so on. In the lowest folder level 290 the folder 29 with the folder name "BGJEDST" comprises all data files 110-110'''' having a hash value from "BGJEDSTA" to "BGJEDSTZ". A request for the file "BGJEDSTA" in this case could imply requesting the file with the file address " . . . /B/BG/BGJ/BGJE/BGJED/ BGJEDS/BGJEDST/BGJEDSTA".

Obviously, depending on the total number of data files, a certain percentage of possible character combinations are not assigned as a hash code. The number of a data files is distributed basically evenly among all folders of the lowest folder level 290, though, so that all requests can be processed within about the same amount of time. Alternatively (as described in FIG. 6), each folder of the lowest level 290 comprises only one data file, wherein the folder and the data file particularly are assigned the same hash value. In this case the number of folders of the lowest level 290 is distributed basically evenly among all folders of the second lowest folder level 260. Thus, in both cases all folders of each folder level basically have the same number of subordinate folders or data files, respectively, leading to a balanced file system.

Figure 8:
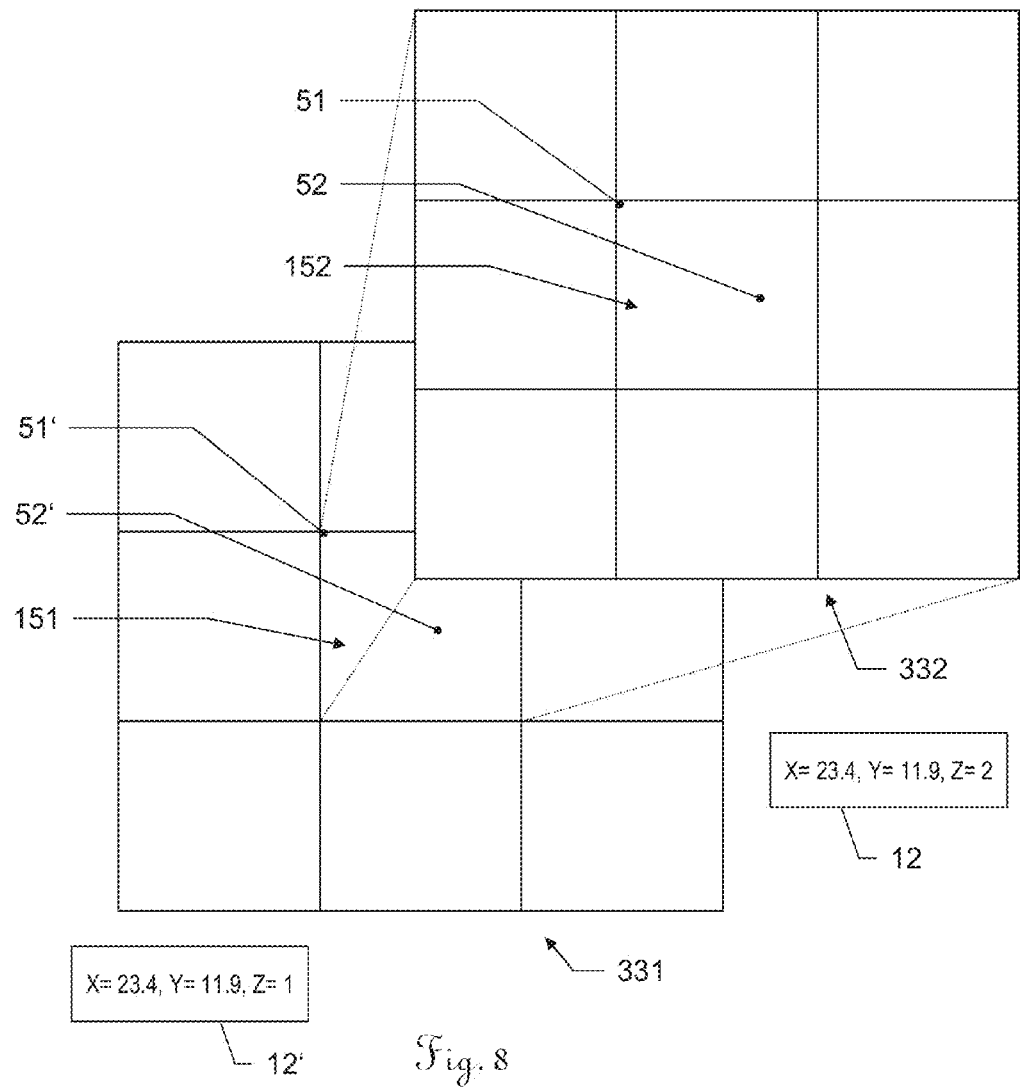
FIG. 8 illustrates the generation of an information designator.

FIG. 8 illustrates how an information designator 12 can be obtained from a demand of new data. Here, the needed data is a new tile of a bitmap, e.g. for being displayed on a display of a mobile device (as shown in FIGS. 3a-b), the bitmap particularly being a representation of a three dimensional surface, e.g. a map of a terrain. There are two resolution levels 331,332 shown, each having nine tiles in a 3×3 arrangement, wherein the nine tiles of the second resolution level 332 represent the same terrain as one tile 151 of the first resolution level 331.

For instance due to a change of the resolution level through a user interaction (as shown in FIG. 3a), a representation of the terrain around the point 52 is to be displayed. The point has X- and Y-coordinates, which together with the resolution level can be used as an information designator 12 of needed data. Alternatively, the needed tile 150 can be identified: Either by a number and resolution level (e.g. the fifth tile of the second resolution level), by a tile number as shown in FIG. 4, or by the coordinates of a defined point in each tile. This defined point can, for instance, be a centre point of the tile 150, or, as depicted here, the corner point 51 in the upper right corner of the tile 150.

Figure 9:
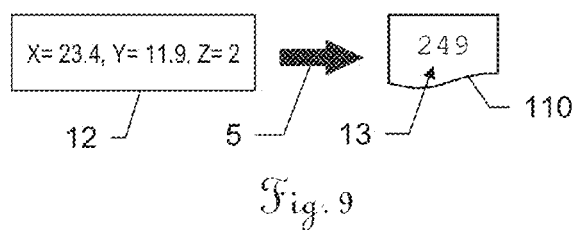
FIG. 9 illustrates the calculation of a request hash value from an information designator.

FIG. 9 illustrates the computing of a request hash value 13 from the information designator 12 (obtained as shown in FIG. 8) for requesting a file 110 with needed data from a remote server. The information designator 12—here two coordinates and a resolution level—is used by a hash algorithm 5 for computing a request hash value 13—in this simplified example "249". The request hash value 13 is then sent to a remote server (not shown) for requesting the data file 110 which is assigned the corresponding hash value 11, in order to download the file 110 and display the data described therein. As the data files 110 are stored in the file system of the server according to their assigned hash values 11, and thus quasi-randomly, the file system is balanced, advantageously leading to shorter average access times. This shortens the average time between demand and provision of the data, thus accelerating the display of the data to the user.

In one embodiment, as described in FIG. 5c, two hash algorithms 5,5' are used for assigning the hash values 11,11' to the data files 110,110'. In this case the same two algorithms are also used for calculating the request hash values 13.

Preferably, with respect to this embodiment and FIGS. 3*a* and 3*b*, in order to always provide the correct data file 110, in the request for a file both request hash values are sent. Alternatively, only the first hash value 13 is sent at first, and an ambiguous hash value is detectable, so that if the request hash value 13 is ambiguous, the server may request to calculate and send a second request hash value.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for displaying a representation of a portion of a terrain on a display of a mobile device, the representation comprising a multitude of tiles in a plurality of resolution levels, the method being exercised by a computing unit of the mobile device and comprising:
   determining a first portion of the terrain that is to be displayed and a first resolution level in which the first portion is to be displayed;
   determining one or more tiles that are needed for displaying the first portion in the first resolution level, wherein at least a first tile of the one or more needed tiles is not stored in the mobile device;
   obtaining a set of coordinates of the first portion related to a defined point of the first tile;
   calculating, by means of a hash algorithm, a hash value, wherein the hash value is calculated based on the set of coordinates and on the first resolution level;
   transmitting, as a request for the first tile, the hash value to a remote server via a public network;
   receiving, in return to the request, a data file from the remote server via the public network, wherein the data file includes the first tile; and
   providing the first tile to the display for displaying the first portion on the display,
   wherein, for avoiding collisions, calculating the hash value comprises calculating two hash values using two different hash algorithms, and
   the two different hash values are transmitted to the server.

2. The method according to claim 1, wherein:
   the mobile device is one of:
      a navigation device;
      a mobile phone; and
      a tablet computer.

3. The method according to claim 1, wherein the two different hash algorithms include CRC32 and SHA1 hash algorithms.

4. The method according to claim 1, wherein:
   a first hash value is calculated by means of a first hash algorithm and transmitted to the server; and
   upon receiving a request from the server, a second hash value is calculated by means of a second hash algorithm and transmitted to the server.

5. The method according to claim 1, wherein determining the first portion of the terrain comprises determining a position of the mobile device.

6. The method according to claim 5, wherein the position of the mobile device is determined by means of a Global Navigation Satellite System.

7. The method according to claim 1, wherein the first portion of the terrain is determined upon a user interaction.

8. The method according to claim 1, wherein the defined point of the first tile is a center point of the first tile.

9. The method according to claim 1, wherein the defined point of the first tile is a corner point of the first tile.

10. The method according to claim 1, wherein the hash value is transmitted wirelessly.

11. The method according to claim 1, wherein the first data file is stored on the server in a hierarchical file system comprising a multitude of data files, wherein upon receiving the hash value from the mobile device, the first data file is identified on the server by means of the hash value and transmitted to the mobile device.

12. The method according to claim 11, wherein the data files are distributed basically evenly in the file system.

13. A mobile device as a client, comprising:
   a display adapted for displaying a representation of a portion of a terrain, the representation comprising a multitude of tiles in a plurality of resolution levels;
   a data storage unit adapted for storing data files including tiles;
   a computing unit comprising a processor and software that are adapted
      to determine a first portion of the terrain that is to be displayed and a first resolution level in which the first portion is to be displayed;
      to determine one or more tiles that are needed for displaying the first portion in the first resolution level, wherein at least a first tile of the one or more needed tiles is not stored in the data storage unit; and
      to obtain a set of coordinates of the first portion related to a defined point of the first tile,
   wherein the computing unit
      comprises a hash algorithm and is adapted to calculate a hash value by means of the hash algorithm, wherein the hash value is calculated based on the set of coordinates and on the first resolution level;
      is adapted to establish a connection for exchanging data with a remote server via a public network, to transmit, as a request for the first tile, the hash value to a remote server via the public network, and to receive in return to the request, a data file from the remote server via the public network, wherein the data file includes the first tile; and
      is adapted to provide the first terrain tile to the display,
   wherein the computing unit comprises two different hash algorithms and is adapted to calculate two hash values by means of the two hash algorithms,
   wherein the computing unit is adapted to:
      calculate a first hash value by means of a first hash algorithm and transmit the first hash value to the server; and
      upon receiving a request from the server, calculate a second hash value by means of a second hash algorithm and transmit the second hash value to the server.

14. The mobile device according to claim 13, wherein:
   the mobile device is one of:
      a navigation device;
      a mobile phone; and
      a tablet computer.

15. The mobile device according to claim 13, wherein the connection for exchanging data is a wireless connection.

16. The mobile device according to claim 13, wherein the two different hash algorithms include CRC32 and SHA1 hash algorithms.

17. The mobile device according to claim 13, further being adapted to receive data about its current position from a Global Navigation Satellite System, wherein determining the first portion of the terrain comprises determining a position of the mobile device.

18. The mobile device according to claim 13, further being adapted to detect a user interaction, and to determine the first portion of the terrain upon the user interaction.

19. The mobile device according to claim 13, wherein the data storage unit comprises a cache.

20. A computer program product, including program code which is stored on a non-transitory machine-readable medium, the program code comprising:
   a hash algorithm; and
   computer-executable instructions that, when executed on a computing unit of a mobile device, perform the following acts of the method according to claim 1:
   determine a first portion of the terrain that is to be displayed and a first resolution level in which the first portion is to be displayed;
   determine one or more tiles that are needed for displaying the first portion in the first resolution level, wherein at least a first tile of the one or more needed tiles is not present in a data storage unit of the mobile device;
   obtain a set of coordinates of the first portion related to a defined point of the first tile;
   calculate, by means of the hash algorithm, a hash value, wherein the hash value is calculated based on the set of coordinates and on the first resolution level;
   transmit, as a request for the first tile, the hash value to a remote server via a public network;
   receive, in return to the request, a data file from the remote server via the public network, wherein the data file includes the first tile; and
   provide the first tile to the display for displaying the first portion on the display,
   wherein, for avoiding collisions, calculating the hash value comprises calculating two hash values using two different hash algorithms, and
   the two different hash values are transmitted to the server.

21. A method for displaying a representation of a portion of a terrain on a display of a mobile device, the representation comprising a multitude of tiles in a plurality of resolution levels, the method being exercised by a computing unit of the mobile device and comprising:
   determining a first portion of the terrain that is to be displayed and a first resolution level in which the first portion is to be displayed;
   determining one or more tiles that are needed for displaying the first portion in the first resolution level, wherein at least a first tile of the one or more needed tiles is not stored in the mobile device;
   obtaining a set of coordinates of the first portion related to a defined point of the first tile;
   calculating, by means of a hash algorithm, a hash value, wherein the hash value is calculated based on the set of coordinates and on the first resolution level;
   transmitting, as a request for the first tile, the hash value to a remote server via a public network;
   receiving, in return to the request, a data file from the remote server via the public network, wherein the data file includes the first tile; and
   providing the first tile to the display for displaying the first portion on the display,
   wherein, for avoiding collisions, calculating the hash value comprises calculating two hash values using two different hash algorithms,
   a first hash value is calculated by means of a first hash algorithm and transmitted to the server, and
   upon receiving a request from the server, a second hash value is calculated by means of a second hash algorithm and transmitted to the server.

* * * * *